L. H. Hunt,
Countersink.
No. 86,674.    Patented Feb. 9, 1869.

Witnesses:

Inventor:
Louis H. Hunt,
by
R. H. Eddy
Atty

United States Patent Office.

LOUIS H. HUNT, OF ROCKINGHAM, VERMONT, ASSIGNOR TO HIMSELF AND NATHANIEL G. MANSON, JR., OF CAMBRIDGEPORT, MASSACHUSETTS.

Letters Patent No. 86,674, dated February 9, 1869.

IMPROVEMENT IN COUNTER-SINK.

The Schedule referred to in these Letters Patent and making part of the same.

*To all persons to whom these presents may come:*

Be it known that I, LOUIS H. HUNT, of Saxton's River village, of the town of Rockingham, of the county of Windham, and State of Vermont, have invented an Improved Tool for Countersinking Wood, &c.; and I do hereby declare the same to be fully described in the following specification, and represented in the accompanying drawings, of which—

Figure 1:
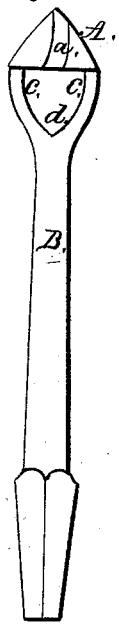
Figure 2:
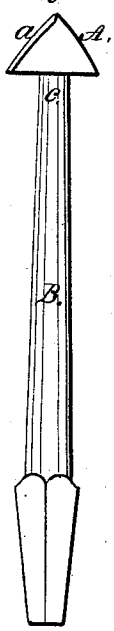
Figure 3:
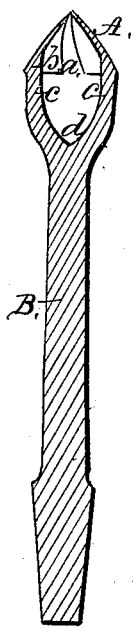

Figures 1 and 2 are side views,

Figure 3, a vertical section, and

Figure 4:
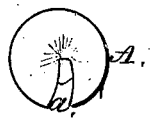

Figure 4, an end view of it.

In such drawings—

A denotes a concavo-convex conical cutter, made of a piece of sheet-steel, bent around in or about in a conical form, and with an opening, or chip-throat, $a$, extending from its apex to its base, and into the conical chamber $b$, within the cutter.

This cutter, so made, is fastened at opposite sides of its base to the two prongs, $c\ c$, of a forked shank, B, made or formed in manner as represented.

The opening $d$ between the prongs $c\ c$ serves to facilitate the escape of the shavings when the tool is at work. Were the shank to go entirely across the base of the cutter, or were it fixed to the middle of the bar, going diametrically across the base, such bar, in the one case, and such shank, in the other, would be an obstruction to the escape of the chips, and would render them liable to become packed in the chamber of the cutter, so as to retard it in its operation.

One common mode of making a countersinking-tool, is to make its cutting-head a solid cone, with teeth on its curved surface, the cone, at its base, being fixed to the end of a straight or unfurcated shank.

Another common mode of making a countersinking-tool, is to form it of a flat piece of steel, made triangular in its cutting-part, and provided with cutting-edges on each of the two opposite sides, which meet at the point, this latter tool being more suitable for countersinking metal; and Another mode of making a tool for countersinking wood, has been to form it with a solid conical head and unfurcated shank, the head having one cutter, and a groove leading therefrom into and through part of the shank.

Such three last-described modes of making such tools render them liable to become choked with chips, or to cut roughly, or leave a burred edge around the hole made by them.

Another kind of countersinking-tool is that represented in Letters Patent No. 79,819, granted May 12, 1868, to Charles Krebs.

My tool varies from this latter, not only in having a forked shank, but in having the prongs thereof affixed to opposite sides of the hollow conical cutter, so that the opening or chip-throat, through the side thereof, shall come between the prongs. This causes the cutter to be better supported by the shank, and less liable to spring or break away from the shank while in use, and besides, the chips have a better chance to escape.

What, therefore, I claim as my improvement, is—

The combination and arrangement of the prongs of the shank with the said shank, and the hollow conical cutter and its chip-throat, the whole being as explained and represented.

L. H. HUNT.

Witnesses:
CHAS. L. HUBBARD,
S. F. HUBBARD.